United States Patent [19]

Panetti

[11] 4,417,466
[45] Nov. 29, 1983

[54] MEASURING METHOD AND DEVICE FOR MEASURING AT LEAST ONE GEOMETRICAL CHARACTERISTIC OF THE HEAD OF THE RAILS OF A RAILWAY TRACK

[75] Inventor: Romolo Panetti, Geneva, Switzerland

[73] Assignee: Speno International S.A., Geneva, Switzerland

[21] Appl. No.: 277,201

[22] Filed: Jun. 23, 1981

[30] Foreign Application Priority Data

Dec. 15, 1980 [EP] European Pat. Off. ............ 80107901
Jul. 24, 1980 [CH] Switzerland .......................... 5659/80
Jul. 24, 1980 [CH] Switzerland .......................... 5660/80

[51] Int. Cl.³ ............................................. G01B 7/28
[52] U.S. Cl. ................................. 73/105; 33/174 PA; 33/203.11; 73/146
[58] Field of Search ............... 73/105, 146; 33/1 Q, 33/174 P, 174 PA, 144, 203.11; 364/560, 561

[56] References Cited

U.S. PATENT DOCUMENTS 3,056,209 10/1962 Oliver ............................. 73/146 X
4,048,849 9/1977 Gocho et al. ..................... 73/105
4,069,590 1/1978 Effinger .

FOREIGN PATENT DOCUMENTS 1065600 11/1979 Canada .
2701216 5/1979 Fed. Rep. of Germany .
2941945 4/1980 Fed. Rep. of Germany .
436364 11/1967 Switzerland .

Primary Examiner—Charles A. Ruehl
Attorney, Agent, or Firm—Young & Thompson

[57] ABSTRACT

A measuring carriage (2,4,6), defining a transverse reference base extending parallel to the plane of the railway track, intended to be connected to a driving vehicle. This carriage comprises three detectors (13, 14, 15) located above and transversely to each line of rails (5) in order to cover a portion of the tracing of the rolling table. These detectors (13,14,15) are connected to an electronic processing circuit (16 to 23, 29) of their signals adapted to determine the amount of curvature (f) of the rolling table and its inclination (i) with respect to the plane of the railway track with the measurements representing the distances (Ya, Yb, Yc) between the reference base and the rolling table under the detectors.

11 Claims, 8 Drawing Figures

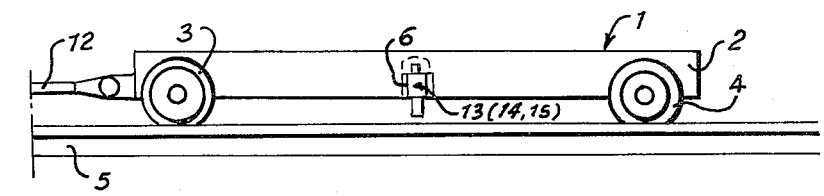
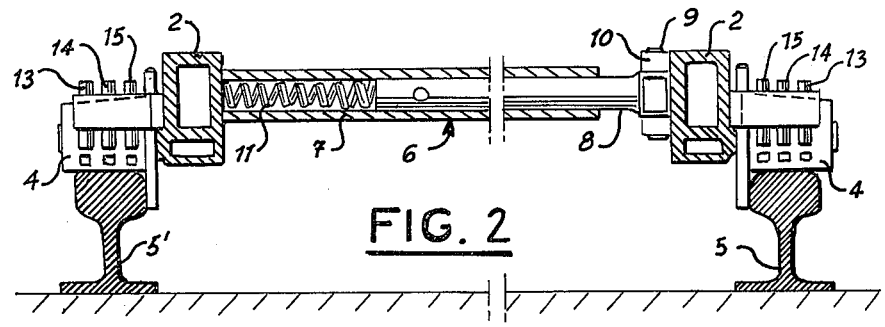
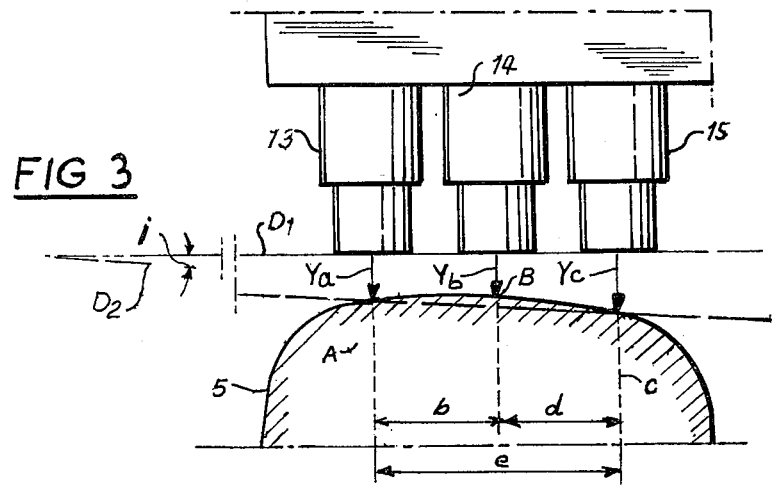

MEASURING METHOD AND DEVICE FOR MEASURING AT LEAST ONE GEOMETRICAL CHARACTERISTIC OF THE HEAD OF THE RAILS OF A RAILWAY TRACK

The present invention has for its object a measuring method of certain geometrical characteristics of the head of the rails of a railway track as well as a device to carry it out.

Measuring devices of the deformation or rails are known, which are capable of measuring the defects of their longitudinal and transverse profile, such as undulations due to wearing caused by the contact with the wheels of the trains.

However other defects of the rolling surface of the rail, due to its wearing off, cannot be detected by these measuring devices, particularly the variations of the geometrical characteristics of the transverse profile of the rolling table, of the neck or side, such as its amounts of curvature and its inclination with respect to the plane of the railway track, as well as the shape of the head of the rail with respect to its reference or original profile and the position of this transverse profile with respect to the other line of rails.

The transverse inclination of the rolling table of the rails towards the inside of the track is provided, in combination with the conicity of the rolling surface of the wheels of the vehicles, to ensure stability of these latter on the track. This inclination varies according to the railway networks between 1/20eth and 1/40eth approximately.

The curvature of the rolling table of the rails is provided to obtain best rail-wheel contact conditions by reducing to a minimum the sliding and friction effects due to the different peripheral rotation speeds to which are subjected the different contact zones of the conical rolling surface of the wheels with the rolling table.

The wear indicated by these two characteristics of the rolling table of rails, inclination and curvature, is thus important to monitor since it contributes importantly to the speeding up of the general alteration of the qualities of the rolling table of the rails of the tracks and should therefore be taken into consideration when deciding on repair by grinding, before that alteration becomes prejudical to the movement of trains.

The invention has the aim to permit through simple means the measurement of certain characteristics of the transverse profile of the head of the rails of a railway track such as the inclination, the curvature or even its partial or whole transverse profile as well as its position with respect to the other line of rails.

The measuring method according to the invention distinguishes itself by the fact that one defines a reference base perpendicular to the axis of the track and parallel to a straight line which is tangent to the rolling plane of the two lines of rails; that one determines the position of at least two points on the surface of the head of a rail with respect to said reference base; and that one determines by means of these measurements at least one characteristic of the transverse profile of the surface of the head of the rail as a function of its position with respect to the other line of rails.

The invention has also for its object a device for the measurement of characteristics of the transverse profile of the head of a rail of a railway track which comprises a measuring carriage in vertical and lateral abutment with the two lines of rails of a railway track by means of resting members, defining a reference base extending perpendicular to the axis of said track and parallel to a straight line which is tangent to the rolling plane of the two lines of rails; at least two detectors delivering signals representative of distances separating at least two longitudinal side lines of the profile of the head of a rail from said reference base; and an electronic processing device comprising a calculating unit determining from the signals emitted by the detectors one characteristic of the actual transverse profile of the rail as a function of its position with respect to the other line of rails.

The attached drawings show schematically and by way of example one embodiment of the measuring device according to the present invention.

FIG. 1 is a side view of a measuring carriage.

FIG. 2 is a transverse cross section, on a larger scale, of this measuring carriage.

FIG. 3 is an enlarged detail of FIG. 2.

Figure 4:
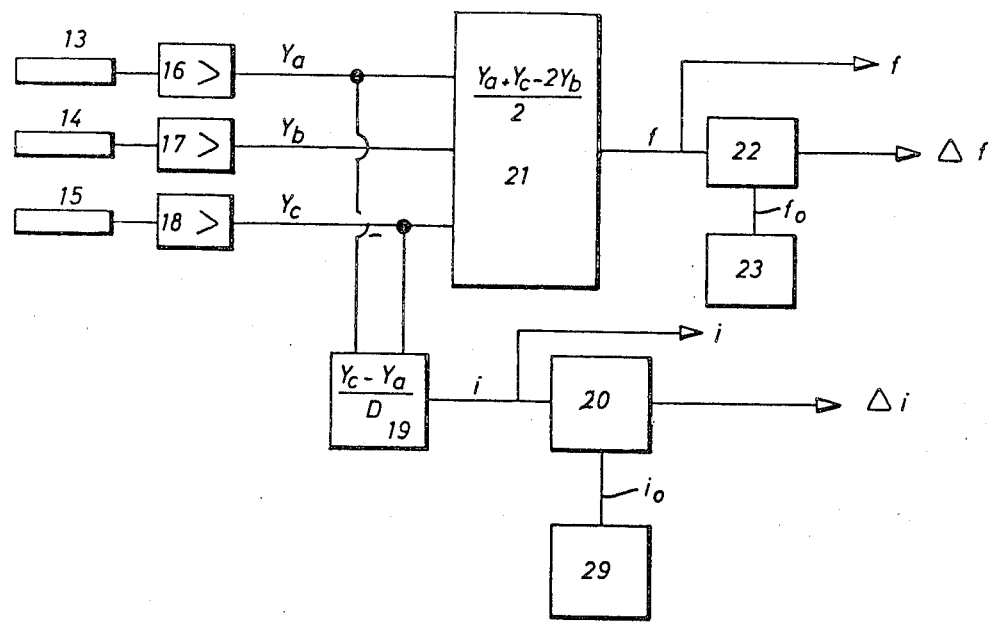
FIG. 4 shows a block diagram of the electronic processing device of the measurements.
Figure 8:
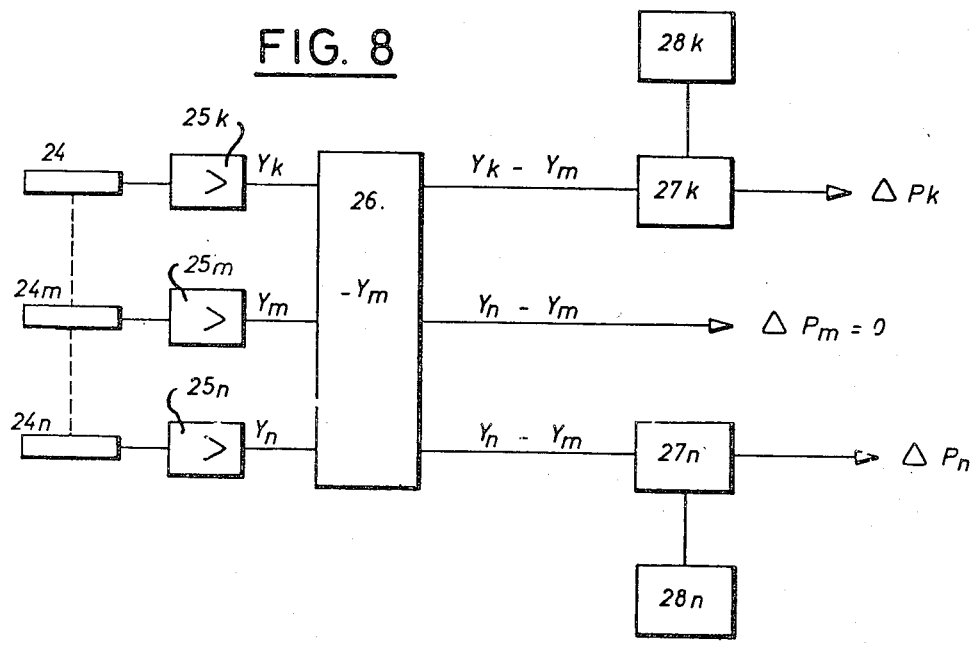
FIG. 8 shows a block diagram of a variant of the electronic processing device of the measurements.
Figure 5:
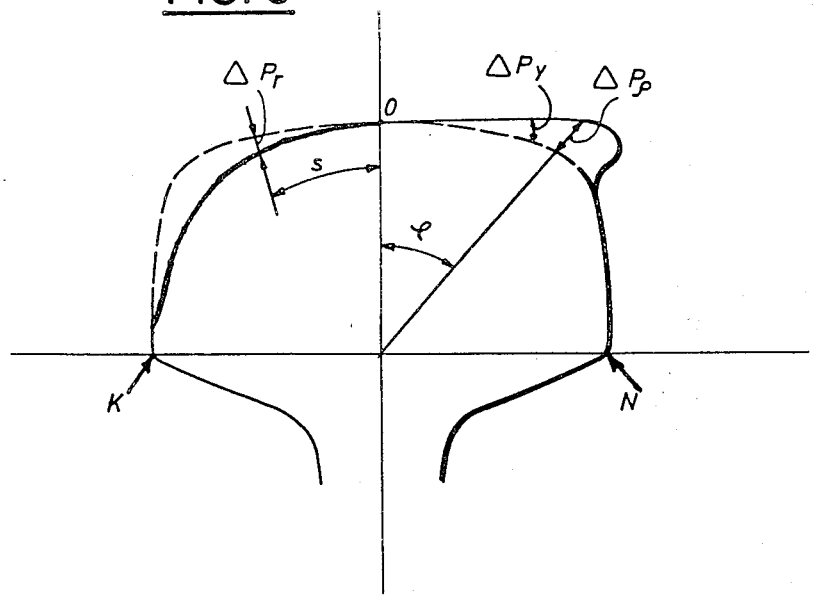
FIG. 5 shows the cross section of the head of a rail with its reference profile in dotted line.

The method according to the present invention intends to determine continuously, that is during the displacement of a vehicle along a railway track, certain characteristics at least of the transverse profile of the head of a rail of said railway track as a function of its position with respect to the other rail, either for each point on the rail, or at given intervals along said rail. Furthermore, it is intended to display the deviation of these characteristics measured on a worn rail with respect to the reference or wanted values relating to a new rail correctly positioned with respect of the other rail of the railway track.

This method enables more particularly to determine these characteristics of the transverse profile of the rail which are:

(1) Its inclination which is represented by the angle formed by a straight line passing through two points located on opposite sides of the rolling surface of the rail with respect to a straight line, tangent to the rolling surfaces of the two rails of a railway track, extending perpendicularly to the longitudinal axis of the track.

(2) Its curvature given by the deflection presented by the rolling surface over a given span.

(3) All or part of the transverse profile, that is the shape of the surface of the head of the rail at a given point on the track, as well as its angular position with respect to the other rail. This is a complex characteristic including the inclination of the rolling surface, its span and its shape, not only in the zone of the rolling surface, but also on the side and neck of the head of the rail.

In order to measure these different characteristics of the transverse profile of the head of the rail, it is necessary to have a reference base, which will be parallel to the plane of the track, determined by a straight line extending perpendicular to the axis of the track and parallel to a tangent to the rolling surfaces of the two lines of rails. Such a reference base can be materialized by part of a measuring carriage rolling on the track by means of rollers resting vertically and horizontally against the two lines of rails.

(a) For the determination of the inclination of the rolling surface of a rail one measures the distances separating the said reference base from two longitudinal side lines of the head of the rail, located approximately on the edges of the rolling surface of the rail. These two values Ya and Yc being known, one determines the inclination of the rolling surface of the rail by means of the following formula:

$$i = \frac{Y_c - Y_a}{D}$$

where D is the distance separating the said longitudinal side lines and i corresponds to the tangent of the inclination angle of the rolling surface.

(b) For the determination of the deflection of the rolling surface, one measures in addition to the distances Ya and Yc the distance Yb separating the reference base from a point of the rail located approximately in the middle of the two longitudinal side lines limiting the rolling surface of the rail and the deflection is then given by the formula:

$$f = \frac{Y_a + Y_c - 2Y_b}{2}$$

(c) Finally, for the determination of the shape and of the angular position of the whole or of a part of the transverse profile of the head of the rail, one measures the distance separating the reference base from a plurality of points on the surface of the head of the rail spaced transversely the ones with respect to the others. One obtains thus, for a given portion of the rail, a group of measurements defining the actual profile of the rolling surface of the head of the rail as a function of its position with respect to the other line of rails.

To be able to use easily the measurements obtained, one proceeds in the following manner:

(a) One records directly the value of the inclination i of the rolling surface of the rail as a function of the displacement along the rail. This value of the inclination of the rail i can also be compared to the desired reference indication io and one delivers a signal $\Delta i$, representing the deviation of the inclination of the rail with respect to its desired inclination, which can also be graphically plotted as a function of the displacement along the rail.

(b) One records directly the value of the deflection f of the rolling surface of the rail as a function of the displacement along the rail.

This value of the deflection f of the rolling surface of the rail can also be compared to the reference deflection fo which is desired in order to obtain a signal $\Delta f$ giving the deviation with respect to the desired deflection. This deviation can also be graphically represented as a function of the displacement along the rail.

(c) One proceeds in the same way, that is by comparison with the values corresponding to the surface profile to show the deviation of shape and of position of the transverse profile of the head of the rail with respect to a reference profile of this head and its angular position with respect to the other line of rails.

However to obtain a usable graphical reproduction, one transforms the deviations $\Delta py$ of the actual profile with respect to the reference profile as deviations $\Delta pr$ measured perpendicularly to the reference profile of the head of the rail or $\Delta p\rho$ measured radially with respect to a pole or center located on the symmetry axis of the rail. These deviations $\Delta p\rho$ or $\Delta pr$ can then be represented graphically as a function either of the angle to the center $\phi$ or of the angle s measured from a median plane of the rail. The theoretical profile is then represented by the abscissa line and the profile deviations $\Delta p$ are plotted as ordinates for each point of measurement. This enables a graphical representation which can be read immediately of the deviations $\Delta p$ with respect to the reference transverse profile and its angular position with respect to the other line of rails. Practically one provides electronically that the deviation $\Delta p$ measured on the median longitudinal side line of the rolling table, or located in the symmetry plane of the rail, be equal to zero. Thus the positive deviations $\Delta p$ correspond to portions of the rail presenting too much material and the negative deviations $\Delta p$ to portions of the rail having not enough material with respect to the reference profile of this rail.

One obtains thereby a precise and easily readable and usuable graphical representation of the deviations of the transverse profile of the rail relative to its shape as well as to its angular positioning.

Such a measurement of the profile can be repeated at regular intervals along the line of rails and one obtains thus, by comparison of the obtained graphs, the evolution of the deformation of the profile of the head of the rail as a function of the distance driven along the track. This evolution can be represented on an oscillograph for example by a sequence of graphs relating to successive points on the rail.

It is evident that one may combine the present measuring method of the characteristics of the transverse profile of a rail with known methods for the measurement of the longitudinal profile of the rail, particularly of its longitudinal undulatory deformations such as described for example in Swiss patent applications CH 2165/79 or CH 2164/79. It is possible to use some of the measurements made according to the present method in combination with other measurements made at longitudinally spaced points along the line of rails to determine the said longitudinal deformations of the rail.

It is also evident that the measurements can be made simultaneously on both lines of rails.

The device for carrying out the method described is shown in FIGS. 1 to 4 and comprises a measuring carriage 1 intended to be displaced continuously along the railway track. This carriage comprises two longitudinal beams 2 bearing each at its ends two rolling and guiding rollers 3 and 4, having an inside abutting flange, resting vertically and laterally on the two lines of rails 5, 5' of a railway track. In a variant, this carriage could have only one transverse beam carrying the rollers in lateral and vertical abuttment on the two lines of rails, means being provided to maintain said transverse beam in a position perpendicular to the axis of the track. A medial telescopic linkage cross beam 6 comprises a part 7 rigidly fastened to one of the longitudinal beams 2 and a movable part 8 hinged at its end on a vertical axis 9 carried by a support 10 fixed to the other longitudinal beam. This movable part 8, having a limited stroke, is subjected to the axial thrust of a coil spring 11 which is sufficient to maintain the flanges of the rollers 3, 4 in abutment against the two lines of rails, 5, 5' during the measuring displacements. This measuring carriage comprises a pole 12 to enable its linkage to a driving railway vehicle.

This measuring carriage 1 is provided with three measuring detectors 13, 14, 15 fixed above and transversely to each line of rails, 5, 5' between the rollers 3 and 4. These detectors are spaced at an interval d so as to cover at least a part of the tracing of the rolling table of the rail, which can be seen on a larger scale in FIG. 3, above three points A, B, C of said rolling table. Preferably, the lines passing through points A and C of the head of the rail approximately delimit the rolling surface of the rail whereas point B is located practically in the longitudinal median plane of the rail. These detectors are electronic detectors which do not enter into contact with the rail, and use for example eddy currents, or are capacitive or optical, and which are able to emit electrical signals representing the distances $Y_a$, $Y_b$, $Y_c$ separating the points A, B, C of the surface of the rolling table of the rail 5 from a transverse reference base $D_1$, which is here defined by the measuring carriage 1. These detectors are used to determine the curvature of the rolling table of the two lines of rails 5, 5' represented by the deflection of subtending the arc AC at the middle point B and its inclination i with respect to the plane of the railway track represented by the tangent of the angle formed by the intersection of the extension of the line passing through points A and C of the tracing of the rolling table with the straight line $D_1$ forming the reference base, which is parallel to the plane of the railway track, and defined by the measuring carriage. This calculation is obtained by using simple formulas:

$$f = \frac{Y_a + Y_c - 2Y_b}{2} \text{ and } i = \frac{Y_c - Y_a}{D}$$

making use of the distances $Y_a$, $Y_b$ and $Y_c$ and the distance $D = 2d$ between the detectors 13 and 15.

In a variant it is possible to make $Y_a$ equal to zero or to a constant value, that is to say that the reference base would pass through the point A. The detector 13 would then be replaced by a roller in contact with the rail at point A. Under these conditions only one measurement is necessary for the determination of the inclination i and only two measurements are necessary for the determination of the deflection f.

The electronic processing device of the signals delivered by the detectors 13, 14 15 is shown in FIG. 4 and comprises amplifiers 16, 17, 18 amplifying and shaping the signals of the detectors and delivering signals $Y_a$, $Y_b$, $Y_c$ representing the distances separating the points A, B, C of the rail from the reference base.

A first calculating unit 19 having a transfer function $$\frac{Y_c - Y_a}{D}$$

is fed with the signals $Y_c$ and $Y_a$ and delivers a signal i, representative of the inclination of the rolling surface of the rail.

The signal i can be directly recorded as a function of the distance traveled along the railway track or delivered to a comparator 20 comparing the signal i to the reference value of said inclination io which is memorized in a memory 29. This comparator delivers a signal $\Delta i$ representing the deviation between the reference value and the actual value of the inclination of the rolling surface of the rail at a given point on this rail with respect to the reference base and therefore with respect to the other line of rails.

This value $\Delta i$ or its running average obtained in a known manner as described in Swiss patent CH 588,374 can be graphically represented as a function of the distance traveled by the measuring carriage.

The electronic device comprises further a second calculating unit 21, the transfer function of which is $$\frac{Y_a + Y_c - 2Y_b}{2}$$

and which is fed by the signals of the three detectors after shaping and delivering a signal f representing the deflection of the rolling surface.

This signal f can be directly recorded as a function of the distance traveled along the track or delivered to a comparator 22 which compares this signal f to the desired value of the deflection fo memorized in a memory 23 and delivers a signal $\Delta f$ representing the deviation of the deflection with respect to the desired reference value.

The signal $\Delta f$ can thereafter be processed in the same way as the signal $\Delta i$ to obtain a graphical representation which is easy to use of the deviations of the deflections of the transverse profile of the rolling surface of the rail, taking into account the angular position of this profile with respect to the other line of rails.

On the recording tape of a recorder the calculated values of the deflection f are recorded either directly as their actual values or in the form of a graph of their variations $\Delta f$ as a function of the path traveled.

The recording device can be a recorder of known type provided or not with a coder to convert the output analogic signals into digital values.

The three detectors 13, 14 and 15 can be spaced apart in the longitudinal direction, for example when their width or other dimensions do not permit to align them in a same plane. In this case, the values representing the distances $Y_a$, $Y_b$, $Y_c$ will be defined in the form of averages of the distances detected over a given length so as to eliminate the influence of the longitudinal defects on the instantaneous values measured.

Of course, more than three detection points may be used for the determination of the amount of curvature of the rolling table, for example when the checking has to be extended to different zones of said rolling table which have different curvatures. In that way, taking into account the symmetry of the rail, it can be advantageous to locate on either side of a central detector, for example situated in the plane of symmetry of the rail, groups of two detectors located symmetrically at different distances.

The example given for the rolling table can be applied also to the neck and side of the head of the rail, either directly, or by pivoting the measuring detector at a given angle with respect to the reference base.

The detectors used could be of another type, for example of the capacitive or optical type can have a contacting feeler formed of a high resistance steel plate, hinged at the end of a movable measuring rod.

When it is wished to know with more precision the transverse profile or section of the head of the rail it is necessary to have a plurality of detectors measuring the distances separating the reference base from points K . . . N on the surface of the head of the rail located on different longitudinal side lines of said head.

Under these conditions the detectors 24k ... 24n measure distances $Y_k ... Y_n$ separating the said points K ... N from the reference base. The output signals of these detectors are amplified and shaped by means of amplifiers 25k ... 25n in order to form the signals $Y_k ... Y_n$ representing the distances separating the points K ... N on the rail from the reference base. These signals $Y_k ... Y_n$ are delivered to a calculating unit 26 subtracting from each of these signals a value Ym corresponding for example to the value of the measurement made on the middle longitudinal side line of the head of the rail so as to obtain indications related to the plane of the rail.

Afterwards each of these signals is individually compared in a comparator 27k ... 27n to the values memorized in a memory 28k ... 28n of a reference profile. These comparators deliver signals $\Delta pk ... \Delta pn$ representing the deviations of the actual profile at points K ... N with respect to the corresponding values of the reference profile.

As these measurements are made during the displacement of the measuring carriage, the average of each signal $\Delta pk ... \Delta pn$ is formed in a known manner over a given interval and thereafter one undertakes its processing to obtain an adequate representation of the deviation of the profile.

In fact, the measurement made determines, in the example described, as well the shape of the profile as its position with respect to the other line of rails along orthogonal axes one of which is the symmetry axis of the transverse cross section of the rail and the other is situated perpendicular to the axis of the rail. But if one represents graphically the actual profile by using these coordinates the sides of the rail are represented in a very imprecise and indeterminate manner and this does not permit a practical use of the representation obtained.

One transforms therefore these Cartesian coordinates of the points K ... N of the rail either to polar coordinates having as origin a pole located on the axis of symmetry of the rail, or to ordinates perpendicular to the reference profile and curvilinear abscissa s.

Figure 6:
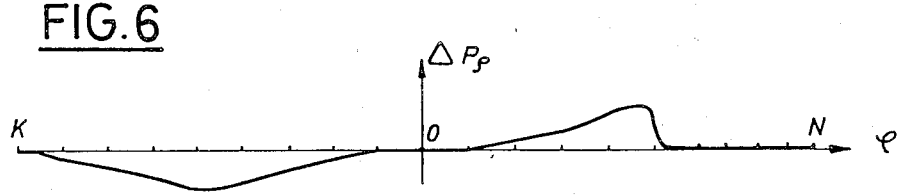

In the first case, one represents then the deviation according to FIG. 6, the reference profile being developed and represented by the horizontal line, the deviation $\Delta p\rho$ being plotted on the ordinate as a function of the angle $\phi$. The signals are so processed that the deviation $\Delta p$ relative to the middle side line, located in the symmetry plane of the rail, will be equal to zero. In this way the positive $\Delta p$ corresponds to a surplus of material and the negative $\Delta p$ to a loss of material of the measured rail with respect to its reference profile.

Figure 7:
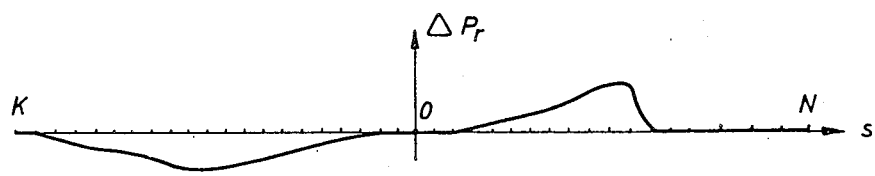
FIGS. 6 and 7 show graphical representations of the transverse profile deviation of the head.

In the second case, one represents the deviation of the profile according to FIG. 7, the reference profile being again developed and represented by the horizontal line, the deviations $\Delta pr$ being plotted on the ordinate as a function of the curvilinear abscissa s of the profile. Here also the deviation measured on the middle longitudinal side line of the rail is taken as origin of the ordinates.

Thanks to these two kinds of representation one obtains a diagram which is easy to read and precise for all the portions of the measured profile.

When displacing thus the measuring carriage along the track, one obtains a succession of graphical representations of the transverse profile of each rail. For their practical use it is of interest to reduce the number of these successive graphs and to effect such a representation only at given intervals, for example every meter. In this case it is possible to record either the instantaneous profile or the average profile along this interval. It is also possible to realize a reproduction for example on an oscillograph, in perspective view of a given number of these successive graphs.

The electronic processing mode of the measuring signals can be modified to obtain other representations, what is important being that the measurement is always made with respect to a reference base which is parallel to the plane of the railway track and perpendicular to its axis in order to obtain an indication of the shape of the transverse profile of the rail as well as of its position with respect to the other line of rails.

In a variant it is evident that one may combine the measurement of the transverse profile of the head of the rail with the known measurement of the longitudinal deformation of the rolling surface of the rail. In such a case it is possible to replace, for example, one of the three detectors described in the Swiss patent applications CH 2165/79 or 2164/79 by one of the detectors described in the present application. In this case the signal delivered by this detector is used simultaneously for the determination of the transverse profile, or of one of the characteristics of the head of the rail, and for the determination of the longitudinal deformation of the rolling surface.

Thanks to the use of a transverse reference base which is perpendicular to the axis of the railway track and parallel to a tangent line to the rolling surfaces of the two lines of rails, any measurements made on one of these lines of rails do not depend soley on the characteristics of this line of rails, but also on its angular position with respect to the other line of rails.

This is one of the essential characteristics of this invention.

While the invention has been described in detail and with reference to specific embodiments thereof, it will be apparent to one skilled in the art that various changes and modifications can be made therein without departing from the spirit and scope thereof.

I claim:

1. Measuring method of at least one geometrical characteristic of the transverse profile of the head of at least one rail of a railway track having two parallel lines of rails, comprising determining a reference base perpendicular to the axis of the track and parallel to a tangent line to the rolling surfaces of the two lines of rails; determining the distances separating at least two longitudinal side lines of the tracing of the head of a rail from said reference base; and calculating from these distances at least one characteristic of the actual transverse profile of the head as a function of its position with respect to the other line of rails.

2. Method according to claim 1, in which the latter determining step comprises determining two distances $Y_a$, $Y_c$ separating the reference base from two points A, C on the rail located on longitudinal side lines of the head of the rail delimiting its rolling surface, and said calculating step comprises calculating a value $$\frac{Y_c - Y_a}{D},$$

D being the horizontal distance separating the said side lines, which represents the inclination of that rolling surface with respect to the plane of the track.

3. Method according to claim 2 in which said latter determining step also comprises determining the distance $Y_b$ separating the reference base from a point B on the rail located substantially midway between points A and C, and said calculating step comprises calculating the value $$\frac{Y_a + Y_c - 2Y_b}{2}$$

which represents the deflection of the rolling surface over the subtended chord.

4. Method according to claim 1, and comparing the value of the calculated characteristic to the value of the same characteristic of a reference profile, and then delivering a signal the value of which corresponds to the deviation of the characteristic of the actual profile from the reference value.

5. Method according to claim 1, and determining simultaneously corresponding characteristics of the actual transverse profile of the heads of the two lines of rails.

6. Device for the measurement of at least one characteristic of the transverse profile of the head of at least one rail of a railway track having two parallel lines of rails, comprising a measuring carriage resting laterally and vertically against the two lines of rails of a railway track defining a reference base perpendicular to the longitudinal axis of the track and parallel to a tangent line to the rolling planes of the two lines of rails; at least two detectors delivering signals representative of distances separating at least two longitudinal side lines of the tracing of the head of a rail from the reference base; and an electronic device comprising a calculating unit determining by the signals delivered by the detectors a characteristic of the actual transverse profile of the rail as a function of its position with respect to the other line of rails.

7. Device according to claim 6, in which the calculating unit has a transfer function $$\frac{Y_c - Y_a}{D},$$

$Y_c$ and $Y_a$ representing said distances for two said detectors, D representing the distance separating the said two detectors, the calculating unit delivering a signal which represents the inclination of the rolling surface of the rail.

8. Device according to claim 6, comprising three said detectors and a second calculating unit having a transfer function $$\frac{Y_a + Y_c - 2Y_b}{2}$$

delivering a signal representing the deflection of the rolling surface of the rail responsive to the signals delivered by said three detectors, $Y_a$ and $Y_c$ representing said distances for two said detectors and $Y_b$ representing a said distance for the third of said detectors disposed midway between said two detectors.

9. Device according to claim 6, comprising a plurality of said detectors each measuring the position of one point of the transverse profile of the head of the rail, said electronic device comprising means comparing the position of the measured points to the position of corresponding points on a reference profile to deliver a signal $\Delta p$ representing the deviation for each considered point with respect to said reference profile.

10. Device according to claim 6, comprising detectors for each line of rails as well as a said electronic device for each line of rails.

11. Device according to claim 6, in which one said detector is also part of a measuring device of the longitudinal deformations of the rolling surface of the rail.

* * * * *